United States Patent [19]

Chilukuri et al.

[11] Patent Number: 5,451,611
[45] Date of Patent: Sep. 19, 1995

[54] PROCESS FOR THE CONVERSION OF POLY(ETHYLENE TEREPHTHALATE) WASTE TO POLY(ALKYLENE TEREPHTHALATE)

[75] Inventors: Ver A. Chilukuri; Sivaram Swaminathan, both of Maharashtra, India

[73] Assignee: Council of Scientific & Industrial Research, New Delhi, India

[21] Appl. No.: 219,214

[22] Filed: Mar. 29, 1994

[51] Int. Cl.$^6$ ............................................. C08J 11/04
[52] U.S. Cl. ................................................... 521/48.5
[58] Field of Search ........................................ 521/48.5

[56] References Cited

U.S. PATENT DOCUMENTS

| | | | |
|---|---|---|---|
| 3,344,091 | 9/1967 | Russin et al. | 521/48.5 |
| 5,252,615 | 10/1993 | Rao et al. | 521/48.5 |
| 5,266,601 | 11/1993 | Kyber et al. | 521/48.5 |

*Primary Examiner*—Morton Foelak

[57] ABSTRACT

The present invention relates to a process for the conversion of poly(ethylene terephthalate) waste to poly(alkylene terephthalate) useful as engineering thermoplastic, which comprises reacting Poly(ethylene terephthalate) powder with a diol containing 3–12 carbon atoms in the liquid phase in the presence of a catalyst at a temperature in the range 180°–270° C. under reduced pressure and inert atmosphere.

9 Claims, No Drawings

PROCESS FOR THE CONVERSION OF POLY(ETHYLENE TEREPHTHALATE) WASTE TO POLY(ALKYLENE TEREPHTHALATE)

This invention relates to an improved process for the conversion of poly(ethylene terephthalate) (PET) waste to poly(alkylene terephthalate). More specifically, this invention relates to the process of adding value to poly(ethylene terephthalate) waste which might be available in the form of fibers, films, bottles and chips, thereby providing efficient means of recycling materials such as poly(ethylene terephthalate).

Poly(ethylene terephthalate) is a crystalline thermoplastic polyester widely used in the manufacture of fibers, films and bottles. Over five million tons of poly(ethylene terephthalate) is consumed world wide in these applications. With the growing use of poly(ethylene terephthalate), there is an increasing concern regarding problems associated with disposal of waste materials. Consequently, intense interest has been focussed on recycling of waste poly(ethylene terephthalate) and their conversion to value added products.

In the prior art, there are three general methods for recovery of value added products from poly(ethylene terephthalate) wastes:

(a) utilizing the poly(ethylene terephthalate) waste as such, as fillers or in blends with other polymers;
(b) depolymerization of poly(ethylene terephthalate) wastes to the starting raw materials and their reuse for the production of polyesters;
(c) reacting the poly(ethylene terephthalate) wastes with polyols, polycarboxylic acids or alcohols to give new polyester oligomers or low molecular weight esters and use thereof.

Depolymerization of polyester waste by glycolysis with excess ethylene glycol in presence of water is a subject of U.S. Pat. No. 4,078,143. However, the formation of an undesirable product, diethylene glycol, results which copolymerizes with bis(hydroxyethylterephthalate). This is a disadvantage in this process. It has been reported that lithium or sodium acetate dihydrate in combination with zinc acetate dihydrate and/or antimony trioxide reduces the formation of diethylene glycol (U.S. Pat. No. 3,830,739).

U.S. Pat. No. 3,728,287 discloses a process for the hydrolysis of polyester with alkoxyethanol and alkali metal hydroxide. Polyesters with repeating glycol and diacid residue are hydrolyzed rapidly by mixing with 2-ethoxyethanol and alkali metal hydroxide at 120°–140° C. for 5–30 min.

The production of fiber grade terephthalic acid (TPA) from waste poly(ethylene terephthalate) has been claimed in U.S. Pat. No. 5,095,145. The process comprises the depolymerization of waste poly(ethylene terephthalate) in water to obtain crude terephthalic acid which is hydrogenated in aqueous solution for up to 8 hours whereby organic and inorganic impurities are retained in the aqueous phase.

U.S. Pat. No. 4,578,502 teaches the solvolysis of waste poly(ethylene terephthalate) to monomers or polycarboxylic acids or esters and low molecular weight glycols by heating slurries or granulated poly(ethylene terephthalate) with water or methanol under pressure. The crude acids are crystallized and the glycols distilled. The recovered products are useful in polymerization.

U.S. Pat. No. 5,578,510 discloses a statistical approach for the hydrolysis of poly(ethylene terephthalate) under controlled equilibrium reaction condition of temperature or pressure, solvolysis of products and concentration of the products to minimize the formation of low molecular weight oligomers ie., minimization of formation of low molecular weight oligomers in hydrolytic depolymerization of poly(ethylene terephthalate).

U.S. Pat. No. 3,907,868 describes an apparatus and process for continuous recovery of dialkyl terephthalate, particularly dimethyl terephthalate from poly(ethylene terephthalate) waste by the reaction of glycols, e.g., ethylene glycol.

U.S. Pat. No. 3,884,850 claims a continuous atmospheric depolymerization of poly(ethylene terephthalate) waste to low molecular weight oligomers to be fed into batch or continuous polyester manufacture.

U.S. Pat. No. 3,488,298 also claims the recovery of starting materials from waste poly(ethylene terephthalate) by the addition of triphenyl phosphite to a partially alcoholized mixture of waste, a lower alcohol and an ester-interchange catalyst, and fractionally distilling the reaction mixture. The phosphorus compound blocks the catalysts preventing ester exchange and prepolymer reaction.

Partial depolymerization of high molecular weight poly(ethylene terephthalate) in presence of a monomer to produce the low molecular weight polymer or transesterification in presence of methanol to yield dimethyl terephthalate is the subject matter of U.S. Pat. No. 3,037,048.

Other processes to depolymerize poly(ethylene terephthalate) waste described in the prior art are:
1. Digestion of poly(ethylene terephthalate) waste with low molecular weight polyols, e.g., diols/triols (U.S. Pat. No. 4,048,104),
2. Treatment of poly(ethylene terephthalate) waste with caustic monohydric alcohol (U.S. Pat. No. 3,728,287),
3. Treatment of monohydric alcohol and ester interchange catalyst (U.S. Pat. No. 3,488,298),
4. Heating with glycol and vinyl acetate (U.S. Pat. No. 3,857,799),
5. Heating with bis ester solvents (U.S. Pat. No. 3,844,850),
6. Dissolving in ethylene glycol and/or terephthalic acid and/or dimethyl terephthalate (U.S. Pat. Nos. 3,907,868; 3,701,741; 3,703,488; 3,776,945; 3,257,335),
7. Reacting the polyester wastes with polyols and/or polycarboxylic acid in presence of titanium catalyst to produce oligomer and then polycondensing the product with at least one polycarboxylic acid or an anhydride and at least one polyol (U.S. Pat. No. 3,951,886).
8. Reaction of poly(ethylene terephthalate) waste with alcohols to produce terephthalate esters of low molecular weight useful as plasticizers (U.S. Pat. Nos. 5,101,064 and 4,929,749).

In most of the processes cited above, the undesirable byproduct diethylene glycol is formed which contaminates the final product and has to be removed by purification before the recovered products can be reused again.

Depolymerization of poly(ethylene terephthalate) leads to starting materials which might be ethylene glycol, terephthalic acid, and low molecular weight oligomers and copolymers, bis(hydroxethylterephthalate) and diethylene glycol after appropriate purification could be used for a variety of applications. For example, polyisocyanate prepolymers for use in preparing an organic polyisocyanate with polyols which are OH-terminated digestion products of waste poly(ethylene terephthalate) and polyols (U.S. Pat. No. 4,048,104). The polyols can be useful in the preparation of cushions, foams and in furniture industries.

Poly(ethylene terephthalate) wastes were treated with polyols in presence of titanium oxalate or tartarate compounds to give oligomeric polyesters which was polymerized with dicarboxylic acid by phosphorous compounds to manufacture polyesters (U.S. Pat. No. 3,951,886).

Hot-melt and pressure sensitive adhesives have been prepared from poly(ethylene terephthalate) waste (U.S. Pat. No. 5,008,366).

The prior art processes described herein, are based on the principle of degrading the polyester waste under hydrolytic conditions, to produce relatively low molecular weight organic compounds and oligomers, separating them and subjecting them to purification and then reusing them.

The object of the present invention is to provide a novel process for converting poly(ethylene terephthalate) waste directly to another high value polymer without breaking down the poly(ethylene terephthalate) to its constituent monomers, or oligomers. Thus, the process aims at converting poly(ethylene terephthalate) waste to poly(alkylene terephthalate) in a single step by the reaction with diols. More specifically, waste poly(ethylene terephthalate) can be converted to either poly(ethylene-co-butylene terephthalate) or poly(butylene terephthalate) (PBT) by reaction with 1,4-butanediol.

Poly(butylene terephthalate) is an engineering thermoplastic prepared from dimethyl terephthalate and 1,4-butanediol. Poly(butylene terephthalate) is characterized by excellent mechanical and electrical properties, low surface friction, exceptionally low moisture absorption, excellent wear properties and good moldability. Poly(butylene terephthalate) is widely used in electronics/electrical industry, appliance parts, gears, bearings, autobody panels, bumpers, fenders and other engineering applications. Poly(butylene terephthalate), by virtue of its superior properties commands a higher price than poly(ethylene terephthalate). Accordingly, the present invention provides an improved process for the conversion of poly(ethylene terephthalate) waste to poly(alkylene terephthalate)s useful as engineering thermoplastics, which comprises reacting poly(ethylene terephthalate) chips with a diol in the liquid phase in the presence of a transesterification catalyst at a temperature in the range of 180°-270° C. under reduced pressure and inert atmosphere of nitrogen, carbon dioxide, argon or helium gas.

The waste poly(ethylene terephthalate) suitable for use in this process will be derived from scrap poly(ethylene terephthalate) products, such as film, fiber, moldings or bottle. They may be virgin, scrap or off spec materials. However, prior to use, the waste poly(ethylene terephthalate) must be thoroughly washed with water, cleaned to remove all foreign matter and dried to a moisture content of less than 0.05%. Thereafter, the waste poly(ethylene terephthalate) must be shredded and pulverized to a powder.

The waste poly(ethylene terephthalate) powder so obtained is mixed with a diol having 3 to 12 carbon atoms in presence of a catalyst and subjected to heating in vacuum. During this process, ethylene glycol is expelled and the diol is incorporated into the polymer. Depending on the conditions, the extent of substitution of the diol in the polymer can be controlled giving rise to copolyesters containing variable ratios of ethylene glycol and a diol having 3-12 carbon atoms in the polymer.

The preferred diol is 1,4-butanediol. However, the process does not preclude the use of other diols such as 1,6-hexanediol, 1,8-octanediol, and 1,6 cyclohexane dimethanol. The mole ratio of diol to poly(ethylene terephthalate) can range from 2:1 to 10:1.

The catalyst suitable for the process are acetates of zinc, lead, cobalt and manganese, antimony oxides, alkoxides and aryloxides of titanium and zirconium, acetylacetonates of titanium and zirconium, organic compounds of tin and salts derived from germanium. The preferred catalysts are alkoxides of titanium and oxides of antimony. The amount of catalyst required is 0.01 to 1% by weight based on poly(ethylene terephthalate), the preferred concentration being 0.1-0.5% by weight.

Initially, poly(ethylene terephthalate) waste powder is dissolved in the diol under a nitrogen atmosphere at 180°-230° C. at 760 mm of Hg pressure in presence of the catalyst and maintained for 2-5 hours. There-after, the pressure is reduced slowly to 1 mm of Hg over a period of 1-2 hours. The temperature is then increased gradually to 270° C. with further reduction in pressure to 0.5 mm Hg and maintained for 1 hour. The distilled ethylene glycol can be recovered for reuse.

By varying temperature and reaction time, compositions corresponding to poly(alkylene terephthalate) or copolyesters containing both alkylene and ethylene groups (in the composition range 50:50 to 98:2) can be obtained. The molecular weight of the polyester as indicated by inherent viscosity, measured at 30° C. in 60:40 tetrachloroethane-phenol ranges between 0.1 to 1.5 dL/g. Further increase in molecular weight, if desired, can be brought about by the process of solid state post polycondensation which are well known in the prior art (Schulz, J. M. and Fakirov, S., Solid State Behaviour of Linear Polyesters and Polyamides. Prentice Hall: Englewood Cliffs; N.J., 1990 and Pilati, F. in Comprehensive Polymer Science, Bevington, J. C. and Allen, G. S., Eds., Pergamon, Oxford, U.K., 1989; Vol. 5, p 25.)

Optionally, the reaction can also be conducted in two stages. In the first stage, the poly(ethylene terephthalate) powder is dissolved in the diol under a nitrogen atmosphere at 180°-230° C. at 760 mm Hg in presence of a catalyst and maintained for 4 hours. The polymer is isolated by dissolution in a suitable solvent and precipitated. In the second stage, the polymer obtained above is post polymerized in presence of a suitable catalyst at 250°-270° C. at a pressure of less than 1 mm Hg for 4-6 hours. The polymer is isolated by dissolution in a solvent and reprecipitated.

The following examples will serve to illustrate the present invention more specifically and which should not however be construed to limit the scope of the present invention.

EXAMPLE 1

Poly(ethylene terephthalate) chips (10.0 g; $\eta_{inh}$ 1.0 dL/g in phenol/tetrachloroethane::40:60 wt/wt), 1,4-butanediol (2.0 g) and antimony trioxide (0.1 g) were taken in a three-necked cylindrical glass reaction vessel and purged with nitrogen gas. The reaction mixture was heated to 220° C. rapidly and stirred gently while nitrogen gas was flushed. The time required for complete dissolution varied from 3 hours. The reaction mixture was additionally maintained under this condition for 3 hours. Thereafter, the pressure was reduced to 1 mm of Hg over 1 hour and the temperature raised to 250° C. and maintained for 3 hours. The poly(ethylene-co-butylene terephthalate) that resulted was isolated by dissolving in a mixture of trifluoroacetic acid and chloroform. The poly(ethylene-co-butylene terephthalate) was precipitated in methanol and dried in vacuo at 100° C. overnight. The poly(ethylene-co-butylene terephthalate) had $\eta_{inh}$ 0.55 dL/g in phenol-tetrachloroethane::40:60 wt/wt at 30° C. and $^1$H-NMR spectrum taken in chloroform-d/trifluoroacetic acid indicated 76% incorporation of 1,4-butanediol. The poly(ethylene-co-butylene terephthalate) had a Tm of 185° C.

EXAMPLE 2

Poly(ethylene terephthalate) chips (10.0 g), 1,4-butanediol (6.5 g) and titanium isopropoxide (0.016 g) were taken in three-necked cylindrical reaction vessel and purged with nitrogen gas. The reaction mixture was heated to 200° C. rapidly and stirred gently while nitrogen gas was flushed. The poly(ethylene terephthalate) chips dissolved in 4 hours. The reaction mixture was maintained for an additional 3 hours at this temperature. The pressure inside the reactor was reduced to 1 mm of Hg over a period of 1 hour and the temperature raised to 250° C. and maintained for 3 hours. The resulting poly(ethylene-co-butylene terephthalate) was isolated by dissolving in trifluoroacetic acid and chloroform and precipitated in methanol. It was dried in vacuo at 100° C. The poly(ethylene-co-butylene terephthalate) had $\eta_{inh}$ of 0.72 dL/g in phenol/tetrachloroethane and $^1$H-NMR spectrum taken in chloroform-d/trifluoroacetic acid indicated 85% incorporation of 1,4-butanediol. The poly(ethylene-co-butylene terephthalate) had a Tm of 210° C.

EXAMPLE 3

Poly(ethylene terephthalate) chips (10.0 g), 1,4-butanediol (13.2 g) and antimony trioxide (0.1 g) were heated at 200° C. in the reaction vessel under a stream of nitrogen. The chips dissolved in 3 hours. The reaction mixture was maintained at 230° C. for 3 hours after which it was gradually evacuated to 1 mm Hg pressure and maintained at 260° C. for 6 hours. The poly(ethylene-co-butylene terephthalate) was isolated and was found to have $\eta_{inh}$ 1.0 dL/g in phenol/tetrachloroethane and $^1$H-NMR spectrum taken in chloroform-d/trifluoroacetic acid indicated 85% incorporation of 1,4-butanediol. The poly(ethylene-co-butylene terephthalate) had a Tm of 201° C.

EXAMPLE 4

Poly(ethylene terephthalate) chips (10.0 g), 1,4-butanediol (13.2 g) and titanium isopropoxide (0.014 g) were reacted at 195° C. for 4 hours and gradually evacuated to a pressure of 1 mm of Hg over a period of 1 hour. The reaction mixture was maintained at 230° C. for 6 hours. The resulting poly(ethylene-co-butylene terephthalate) had $\eta_{inh}$ of 0.44 dL/g in phenol/tetrachloroethane, and $^1$H-NMR spectrum taken in chloroform-d/trifluoroacetic acid indicated 62% incorporation of 1,4-butanediol. The poly(ethylene-co-butylene terephthalate) had a Tm of 185° C.

EXAMPLE 5

Poly(ethylene terephthalate) chips (10.0 g) and 1,4-butanediol (2.0 g) were reacted in presence of titanium isopropoxide (0.016 g) at 200° C. for 4 hours when the chips dissolved. The reaction mixture was held at this temperature for 3 hours it was raised to 230° C. and evacuated to 1 mm of Hg the temperature was raised to 265° C. and held at this temperature and pressure for 3 hours. The resulting poly(ethylene-co-butylene terephthalate) sample had $\eta_{inh}$ of 0.30 dL/g in phenol/tetrachloroethane, and $^1$H-NMR spectrum taken in chloroform-d/trifluoroacetic acid indicated 85% incorporation of 1,4-butanediol. The poly(ethylene-co-butylene terephthalate) had a Tm of 181° C.

EXAMPLE 6

Poly(ethylene terephthalate) chips (10.0 g), 1,4-butanediol (13.2 g) and antimony trioxide (0.1 g) were reacted at 200°–230° C. for 4 hours under a stream of nitrogen. The dissolved mass was held at 230° C. for 3 hours when the pressure in the system was reduced to 1 mm of Hg and the temperature raised to 250° C. held for further 10 hours. The poly(ethylene-co-butylene terephthalate) had the following: $\eta_{inh}$ 0.74 dL/g in phenol/tetrachloroethane, and $^1$H-NMR spectrum taken in chloroform-d/trifluoroacetic acid indicated 77% incorporation of 1,4-butanediol. The poly(ethylene-co-butylene terephthalate) had a Tm of 198° C.

EXAMPLE 7

Poly(ethylene terephthalate) (10.0 g), 1.4-butanediol (13.2 g) and antimony trioxide (0.1 g) were reacted at 210°–230° C. for 4 hours under a stream of nitrogen. The pressure was reduced to less than 1 mm Hg over 1 hour and the temperature was raised 260° C. and held for 3 hours. The poly(ethylene-co-butylene terephthalate) had the following: $\eta_{inh}$ 0.25 dL/g in phenol/tetrachloroethane, and $^1$H-NMR spectrum taken in chloroform-d/trifluoroacetic acid indicated 91% incorporation of 1,4-butanediol. The poly(ethylene-co-butylene terephthalate) had a Tm of 208° C.

EXAMPLE 8

Poly(ethylene terephthalate) (10.0 g), 1,4-butanediol (13.2 g) and antimony trioxide (0.1 g) were heated at 205° C. for 4 hours in nitrogen. The reaction mixture was cooled and the poly(ethylene-co-butylene terephthalate) was isolated by dissolving in a mixture of chloroform and trifluoroacetic acid and precipitated in methanol. It was dried in vacuo at 100° C. overnight. The poly(ethylene-co-butylene terephthalate) had the following: $\eta_{inh}$ 0.15 dL/g in phenol/tetrachloroethane, and a Tm of 174° C.

The poly(ethylene-co-butylene terephthalate) thus obtained was post polymerized in presence of antimony trioxide at 270° C. for 4 hours at a pressure of less than 1 mm Hg. The resulting poly(ethylene-co-butylene terephthalate) had $\eta_{inh}$ 0.55 dL/g in phenol/tetrachloroethane, and $^1$H-NMR spectrum taken in chloroform-d/trifluoroacetic acid indicated 87% incorporation of 1,4-butanediol. The poly(ethylene-co-butylene terephthalate) had a Tm of 212° C.

EXAMPLE 9

Poly(ethylene terephthalate) (10.0 g), 1,4-butanediol (13.2 g) and titanium isopropoxide (0.016 g) were heated in nitrogen at 180°-210° C. for 4 hours. The reaction mixture was cooled and poly(ethylene-co-butylene terephthalate) was isolated by dissolving in a mixture of chloroform and trifluroacetic acid and precipitated in methanol. It was dried in vacuo at 100° C. overnight. The poly(ethylene-co-butylene terephthalate) had the following: $\eta_{inh}$ 0.10 dL/g in phenol/tetrachloroethane, and a Tm of 166° C.

The poly(ethylene-co-butylene terephthalate) thus obtained was post polymerized in presence of antimony trioxide at 260° C. for 4 hours at a pressure of less than 1 mm Hg. The poly(ethylene-co-butylene terephthalate) had $\eta_{inh}$ 0.30 dL/g in phenol/tetrachloroethane, and $^1$H-NMR spectrum taken in chloroform-d/trifluoroacetic acid indicated 75% incorporation of 1,4-butanediol. The poly(ethylene-co-butylene terephthalate) had a Tm of 200° C.

EXAMPLE 10

Poly(ethylene terephthalate) (10.0 g), 1,4-butanediol (13.2 g), titanium isopropoxide (0.016 g) were reacted in nitrogen at 190° C. for 4 hours. The reaction mixture was cooled and the resulting poly(ethylene-co-butylene terephthalate) was isolated by dissolving in a mixture of chloroform and trifluoroacetic acid and precipitated in methanol. It was dried in vacuo at 100° C. overnight. The poly(ethylene-co-butylene terephthalate) had the following: $\eta_{inh}$ 0.46 dL/g in phenol/tetrachloroethane, and a Tm of 202° C.

The poly(ethylene-co-butylene terephthalate) thus obtained was post polymerized in presence of antimony trioxide at 265° C. for 4 hours at a pressure of less than 1 mm Hg. The resulting polymer had $\eta_{inh}$ 0.49 dL/g in phenol/tetrachloroethane, and $^1$H-NMR spectrum taken in chloroform-d/trifluoroacetic acid indicated 85% incorporation of 1,4-butanediol. The poly(ethylene-co-butylene terephthalate) had a Tm of 204° C.

EXAMPLE 11

Poly(ethylene terephthalate) (10.0 g), 1,4-butanediol (13.2 g), titanium isopropoxide (0.016 g) were reacted in nitrogen at 200° C. for 4 hours. The reaction mixture was cooled and the polyester was isolated by dissolving in a mixture of chloroform and trifluoroacetic acid and precipitated in methanol. It was dried in vacuo at 100° C. overnight. The polyester had the following: $\eta_{inh}$ 0.20 dL/g in phenol/tetrachloroethane, and a Tm of 210° C.

The polyester thus obtained was post polymerized in presence of antimony trioxide at 270° C. for 6 hours at a pressure of less than 1 mm Hg. The resulting polyester had $\eta_{inh}$=0.52 dL/g in phenol/tetrachloroethane and a Tm of 221° C. $^1$H-NMR spectrum taken in chloroform-d/trifluoroacetic acid indicated a complete replacement of ethylene glycol with 1,4-butanediol.

EXAMPLE 12

Poly(ethylene terephthalate) (10.0 g), 1,4-butanediol (13.2 g), antimony trioxide (0.010 g) were reacted in nitrogen at 210°-230° C. for 4 hours. The reaction mixture was cooled and the polyester was isolated by dissolving in a mixture of chloroform and trifluoroacetic acid and precipitated in methanol. It was dried in vacuo at 100° C. overnight. The polyester had the following: $\eta_{inh}$ 0.10 dL/g in phenol/tetrachloroethane, and a Tm of 191° C.

The polyester thus obtained was post polymerized in presence of antimony trioxide at 260° C. for 4 hours at a pressure of less than 1 mm Hg. The resulting polyester had $\eta_{inh}$=0.54 dL/g in phenol/tetrachloroethane and a Tm of 220° C. $^1$H-NMR spectrum taken in chloroform-d/trifluoroacetic acid indicated a complete replacement of ethylene glycol with 1,4-butanediol.

EXAMPLE 13

Poly(ethylene terephthalate) (10.0 g), 1,6-hexanediol (20 g), antimony trioxide (0.100 g) were reacted together in a nitrogen atmosphere at 210°-230° C. for 4 hours. The reaction mixture was evacuated to a pressure of 1 mm of Hg over one hour. Thereafter the temperature was raised to 250° C. and maintained at that condition for 4 hours. The reaction mixture was cooled and the polymer was isolated by dissolving in a mixture of trifluoroacetic acid and dichloromethane and precipitated in methanol and dried in vacuo at 100° C. overnight. The poly(1,6-hexylene terephthalate) had an inherent viscosity of 0.45 dL/g in phenol/tetrachloroethane::40:60 wt/wt. $^1$NMR spectrum of the polyester taken in chloroform-d/trifluoroacetic acid indicated a complete replacement of the ethylene glycol by 1,6-hexanediol.

EXAMPLE 14

Poly(ethylene terephthalate) (10.0 g), 1,4-cyclohexane dimethanol (20 g), antimony trioxide (0.100 g) were reacted together in a nitrogen atmosphere at 210°-230° C. for 4 hours. The reaction mixture was evacuated to a pressure of 1 mm of Hg over one hour. Thereafter the temperature was raised to 250° C. and maintained at that condition for 4 hours. The reaction mixture was cooled and the poly(1,6-cyclohexylene dimethylene terephthalate) was isolated by dissolving in a mixture of trifluoroacetic acid and dichloromethane and precipitated in methanol and dried in vacuo at 100° C. overnight. The polyester had an inherent viscosity of 0.22 dL/g in phenol/tetrachloroethane::60:40 wt/wt. $^1$NMR spectrum of the polyester taken in chloroform-d/trifluoroacetic acid indicated complete replacement of ethylene glycol by 1,4-cyclohexane dimethanol.

The main advantage of this invention comprises of
a) single step and direct conversion of waste poly(ethylene terephthalate) to poly(alkylene terephthalate) or poly(ethylene-co-alkylene terephthalate of any desired composition,
b) polyesters with good colour, and
c) little or no by-product formation.
d) Use of standard esterification reactors which can operate at either atmospheric pressure or under vacuum.

We claim:
1. A process for the conversion of poly(ethylene terephthalate) waste to poly(alkylene terephthalate) useful as an engineering thermoplastic, which consists essentially of reacting poly(ethylene terephthalate) waste powder with 1,4-butane diol in the liquid phase in the presence of a catalyst selected from group consisting of antimony and titanium compounds at a temperature in the range 180°-270° C. under reduced pressure and an inert atmosphere.

2. A process as claimed in claim 1, wherein the Poly(ethylene terephthalate) powder are derived from fibre, film, moldings, bottles and the like.

3. A process as claimed in claim 1, wherein the diol used is in 2-10 fold excess over Poly(ethylene terephthalate) on a mole basis.

4. A process as claimed in claim 1, wherein the amount of catalyst used ranges from 0.01 to 1% by weight with reference to Poly(ethylene terephthalate), preferably 0.1 to 0.5 wt %.

5. A process as claimed in claim 1, wherein in the reaction is effected at a pressure ranging from atmospheric to subatmospheric.

6. A process as claimed in claim 1, wherein the pressure used ranges from 760 mm of Hg initially for a period of 2 to 5 hours and subsequently reduced gradually to 0.1 mm of Hg.

7. A process as claimed in claim 1, wherein the temperature is initially maintained between 180°-230° C. for a period of 2 to 5 hours and thereafter increased gradually to 270° C.

8. A process as claimed in claim 1, wherein the total reaction time is between 1 to 12 hours.

9. A process as claimed in claim 1, wherein the inert atmosphere is maintained using nitrogen, carbon dioxide, argon or helium gas.

* * * * *